July 2, 1963 D. HAUBOLD 3,095,588
APPARATUS FOR FORMING NAILS FROM WIRE STOCK
Filed Feb. 1, 1960 3 Sheets-Sheet 1

INVENTOR
Dieter HAUBOLD
by Richards & Geier
ATTORNEYS

INVENTOR
Dieter HAUBOLD
by
Richards & Geier
ATTORNEYS

United States Patent Office 3,095,588
Patented July 2, 1963

3,095,588
APPARATUS FOR FORMING NAILS FROM
WIRE STOCK
Dieter Haubold, Lutzowstrasse 8—10,
Hannover, Germany
Filed Feb. 1, 1960, Ser. No. 5,865
Claims priority, application Germany Jan. 30, 1959
1 Claim. (Cl. 10—43)

The present invention relates to a method of manufacturing nails which are joined together in strips and to an apparatus for working this method. Use of nail strips as disclosed in this application is made with fastener driving machines, which have a magazine for insertion of the fasteners and are usually operated by compressed air in that the fastener is automatically detached from its strip and driven into a workpiece.

Where a plurality of nails is to be joined together in strips, nail head and body have to have like diameter so that the single nails are contiguous with one another along their whole lengths and can be stuck together, for instance, by means of an adhesive substance. So far, nails of this type have been combined into strips only after they were one by one manufactured from wire or stamped out of sheet iron.

However, this widely used method requires a plurality of working strokes which cause a certain amount of cost each, and therefore does not allow for mass production which is cheap enough to supply the nail strips at very low prices and in bigger quantities.

It is, therefore, the main object of the invention to provide a new method of manufacturing nail strips, which guarantees a simpler and more economical production.

Another object is to provide an apparatus for the manufacture of nail strips, which is in agreement with the method according to this invention.

These and other objects of the invention, and the way, in which they are accomplished, are set forth in detail in the following specification with reference to the accompanying drawings forming part thereof.

Figure 1:
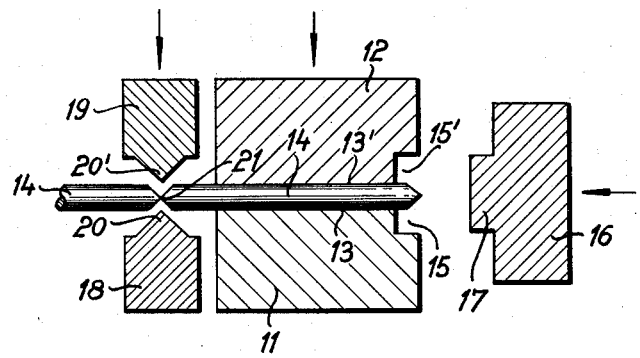
FIG. 1 is a longitudinal section of a preferential construction of an apparatus according to the invention.

The nail strips are manufactured in that a multitude of wires is inserted into a die, where all the wire ends under the working stroke of one common stamp, are simultaneously shaped into heads. While so far each nail has been individually manufactured in a die, the ratio of the invention resides in the manufacture in one working stroke of a multitude of nails, which may then be inserted, joined together into strips, into a magazine of a fastener driving machine, similar to the manner in which strips of staples are fixed in such magazines. The method according to the invention enables a highly economic production of strips of nails and thus is a solution of the problem of using nails in fastener driving machines.

In a preferential embodiment of the invention the wires are united to a tape before they are inserted into the die, so that—after the nail ends have been jumped into heads in the die—they form ready strips of nails, which can be inserted into the hand-operated, automatically or pressure-operated fastener driving machine, without any refinishing work being required. The joining of the wires into a tape may be performed by soldering, welding or affixing an adhesive substance or foil. One may also join the wires together when they are in the die. In other cases it is useful to combine the ready nails into strips only after they have been treated in the die.

A die suitable for the method according to the invention preferably consists of two reversely-like parts, being provided with grooves extending in parallel direction close to one another in a number equal to the number of wires to be inserted, which grooves end in a chamber, and the latter is the guidance for a stamp which may consist of one or a plurality of parts, and jumps the wire ends, which project into the chamber, into heads.

The die for the wire or nail heads should be such that it shapes only the two outer heads of the wire tape. The inner wire heads need not be shaped as their lateral faces are formed by their respective neighbouring heads. It is also possible to spare special shapes for the two outer heads of the wire tape because these do not yield much in lateral direction under the working stroke of the stamp and the outer lateral faces of the heads extend approximately parallel to the inner lateral faces also where they are not guided. Thus, each wire head of the tape is shaped with two even parallel lateral faces and is of a breadth, which is equal to the diameter of the nail body being made of the wire. The top view of the heads shows an approximately rectangular surface, the short edges of which are straight or bent. The die may, of course, be modified in that it shapes the lateral faces of all the heads. Further, in its top view the heads may, for instance, be of oval shape.

Subsequent to each working stroke of the stamp the die is opened, and the nails are ejected from it in finished strips.

To summarize the afore described, the invention replaces the manufacturing methods hitherto used, in which each single nail has been headed in a die, by a method in which a multitude of nails are cut and headed in one simultaneous working stroke, which nails are combined to strips either before or subsequent to their heading.

The wires used for the manufacture of the nails may be of circular, oval, cornered or other section, but preferably is rectangular or square in cross section. In any case the nail head will have an essentially rectangular shape, the width of which is equal to the diameter of the nail body so that the single nail bodies are adjacent to one another and can without difficulty be joined together in strips.

The nail points may be made at the same time the heads are formed. This is advantageous with chisel points, where a tongs-like tool may be used not only for stamping the points, but also for separating the nail strips from the wire tape. It is in the spirit of the invention to provide the nail points with a coned or pyramidal shape, which can be accomplished by setting the tools accordingly.

Figure 2:
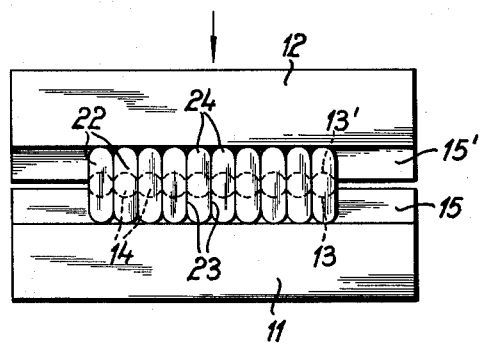
FIG. 2 is a top view of said apparatus.

To perform the above-described method, I have designed the apparatus shown in FIGS. 1 and 2, in which the two parts 11 and 12 are of reverse-like shape and at their respective inner sides are provided with a plurality of grooves 13, 13' parallelly extending close to each other in a number equal to the number of wires 14, which form the wire tape. The grooves 13, 13' are of nearly semi-circular cross-section so that the single wires 14, being inserted into the die in horizontal direction, are entirely enclosed by them. The grooves 13, 13' extend to a rectangular chamber 15, 15', into which the ends of the wires 14 project. The part 11 of the die is fixed, whereas the part 12 is shiftable in vertical direction. In coaxial position to the die 11, 12, a stamp 16, consisting of one part, is arranged and shiftable in a horizontal direction. At its front end said stamp has a teat 17, which fits into the chamber 15, 15'.

Two cheeks 18, 19 are arranged in front of the die 11, 12 and are vertically shiftable toward each other. At their facing sides the cheeks are provided with cutting edges 20, 20', extending over the whole width of the wire tape 14.

The apparatus works as follows:

The wire tape 14, consisting of a multitude of wires—in FIG. 2, by way of an example, of ten wires—is introduced into the open die body 11, 12, whereupon the die part 12 is vertically shifted downwards in the direction of the arrow, thus closing the die. Simultaneous with the closing of the die part 12 the two cheeks 18, 19 are moved against each other so that the cutting edges 20, 20' cut through the wires 14 and provide said wires with chisel points 21. At the same time or subsequent to this cutting stroke the stamp 16 is laterally moved to the left in the direction of the arrow, according to FIG. 1, whereby the ends of the wires 14, extending into the chamber 15, 15', are upset into heads 22 by means of the teat 17. The wires 14 cannot yield during this stroke on account of their being rigidly clamped in the grooves 13, 13'.

As it is disclosed in FIG. 2, the heads 22 of the wires 14 are of essentially rectangular shape, the lateral faces 23 of which are adjacent to one another, and the distance between the two lateral faces 23 of each wire is exactly the same as the diameter of the wires 14 before the heading process, so that the shape of the heads does in no case space the wires from each other. The short lateral faces 24 are rounded.

After this working stroke the stamp 16 and the cheeks 18, 19 are returned into their initial positions as shown in FIG. 1, whereupon the die part 12 is shifted upwards in the direction opposite to the arrow, and the wire tape 14 with its heads is driven out of the die, and the next portion of the tape is introduced into the die.

The afore-described proceedings can be automatic, and they do not need much time so that mass production of strips of nails is made possible.

The chisel point 21 stamped by the cheeks 18, 19 is in many cases sufficient to reliably drive the nails into the workpiece.

Figure 3:
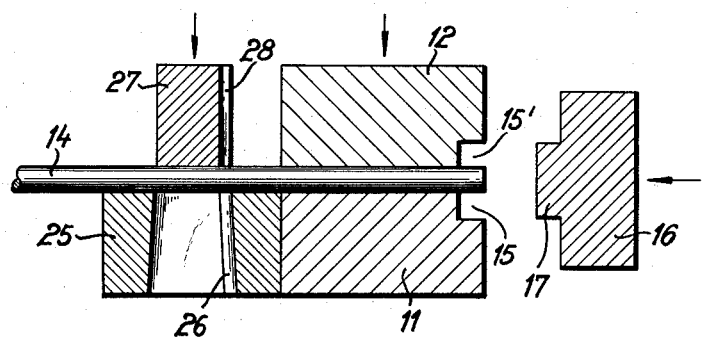
FIG. 3 is a longitudinal section of a modified construction of the apparatus.
Figure 4:
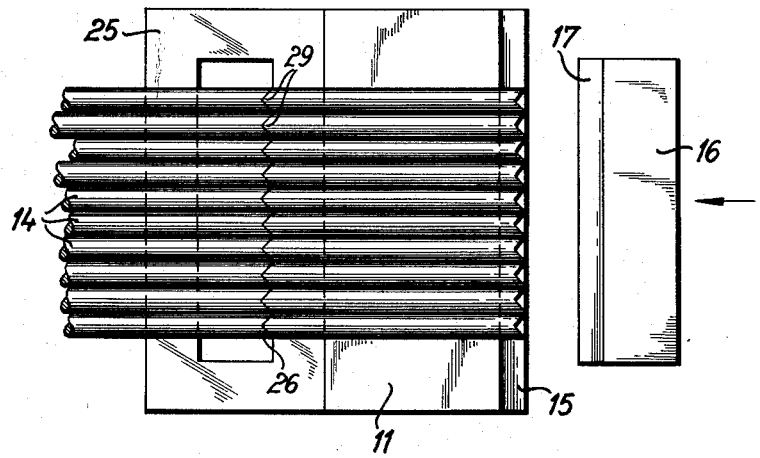
FIG. 4 is a top view of the apparatus of FIG. 3.

The construction according to FIGS. 3 and 4 is in agreement with FIGS. 1 and 2, as far as the construction of the die 11, 12 and the stamp 16, 17 is concerned. However, the movable cheeks 18, 19 are replaced by a matrix 25, which is located at the rigid die part 11, and at that part, which is nearer to the die part 11, has a serrated cutting edge 26. In coordination with the matrix 25 is a vertically shiftable cutter stamp 27, which is provided with a cutting edge 28, being in correspondence with a cutting edge 26, and is coupled to the shiftable die part 12. The cutter stamp 27, by its cutting edge 28, in connection with the cutting edge 26 of the matrix 25, forms a chisel point 29 in each wire of the tape 14.

The operation of this apparatus is nearly the same as in FIGS. 1 and 2, with the only difference that the single nail lengths are separated from the wire tape 14 and the chisel points 29 are cut by the stamp 27 at the same time the die part 12 is moved into closing position.

Figure 5:
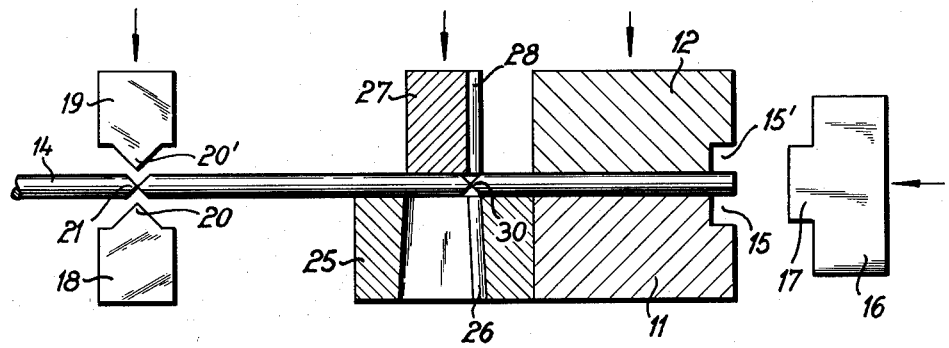
FIG. 5 is a longitudinal section of still another modified construction of the apparatus and FIG. 6 is the top view of FIG. 5.
Figure 6:
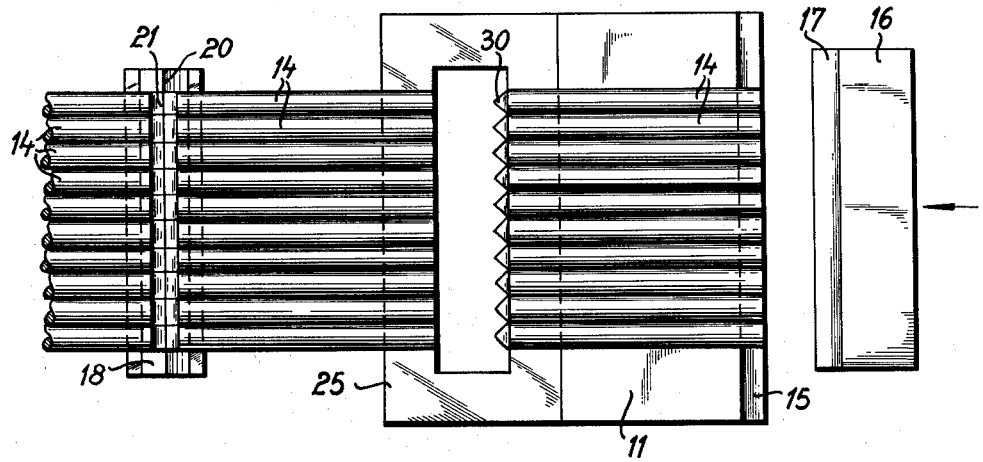

If the nails are intended to have a pyramidal instead of a chisel point the apparatus according to FIGS. 3 and 4 may be additionally provided with the cutting cheeks 18, 19 of the first construction as this is shown by way of an example in FIGS. 5 and 6.

In this modified construction, the cutting cheeks 18, 19 are arranged, regarded in advance direction of the wire tape, in front of the separation device 25, 27 and spaced from it by one nail-length.

Their purpose is to cut the chisel points into the wire tape. However, the checks 18, 19 do not cut the whole way through the wires 14, so that the latter remain unseparated. Next, the wires will pass the cutting device 25, 27, which is located one nail-length behind the edges 20, 20' in rigid connection with the die 11, 12 and is provided with cutting edges 26, 28, which are turned by an angle of 90° against the cutting edges 20, 20' and transform the chisel point 21 into a pyramidal point 30, and at the same time finally separate the nail from the wire. After the nail head is formed by the working stroke of the stamp 16, and the die part 12 and cheek 27 are shifted upwards in the direction opposite to the arrow, and simultaneously the finished strip of nails is ejected from the apparatus.

The ejecting device used for this purpose is not shown in the drawing as this device is not subject of the invention.

The advance direction of the wire tape 14 need not necessarily be horizontal, as this is the case in the described constructions. The invention applies to vertical or other moving directions of the wire tape with equal competence.

Since these and other changes may be made in the invention and different embodiments may be made without departing from the scope thereof, the above specification is meant to be understood in an illustrative and not in a limiting sense.

I claim:

An apparatus for manufacturing nails, comprising, in combination, a die body consisting of an upper part and a lower part, said parts having opposed surfaces and a plurality of parallel opposed grooves formed in said surfaces, said grooves lying in parallel juxtaposition with respect to each other, said upper part being movable into engagement with said lower part, said die body parts having an open recessed portion, having parallel side walls the ends of said grooves being uniformly spaced from said walls of said recessed portion, a stamp having a part fitting into the recessed portion of said die body, two opposed movable cheeks spaced from said die body and having cutting edges extending the entire width of said plurality of grooves transversely to the direction of said grooves, said cutting edges having points movable to a cutting position wherein they are located adjacent a plane extending through the interengaging opposite surfaces of the die body parts, a matrix located between said cheeks and said die body and having a supporting surface extending substantially in the plane of the bottoms of the grooves of said lower part, said matrix having an inner space, a serrated cutting edge located in said space and close to said die body, said cutting edge extending substantially perpendicularly to the direction of said grooves to said supporting surface, and a movable cutter stamp located above said matrix and having a cutting edge extending substantially parallel to the last-mentioned cutting edge and cooperating therewith, the cutting edges of said cheeks having surfaces extending substantially perpendicularly to the surfaces of the cutting edges of the matrix and cutter.

References Cited in the file of this patent

UNITED STATES PATENTS

| | | |
|---|---|---|
| 290,912 | Moore | Dec. 25, 1883 |
| 333,709 | Woodward | Jan. 5, 1886 |
| 1,274,848 | Boyle | Aug. 6, 1918 |
| 1,464,755 | Ditson | Aug. 14, 1923 |
| 1,591,239 | Scholtiseck | July 6, 1926 |
| 1,921,515 | Farrell | Aug. 8, 1933 |
| 2,216,049 | Rice | Sept. 24, 1940 |
| 2,294,463 | Krantz | Sept. 1, 1942 |
| 3,019,460 | Corckran | Feb. 6, 1962 |